Oct. 13, 1953    E. C. RHODES ET AL    2,654,946
SOLDERED JOINT FOR CHROMIUM ALLOY GAS TURBINE STRUCTURES
Filed Sept. 7, 1950
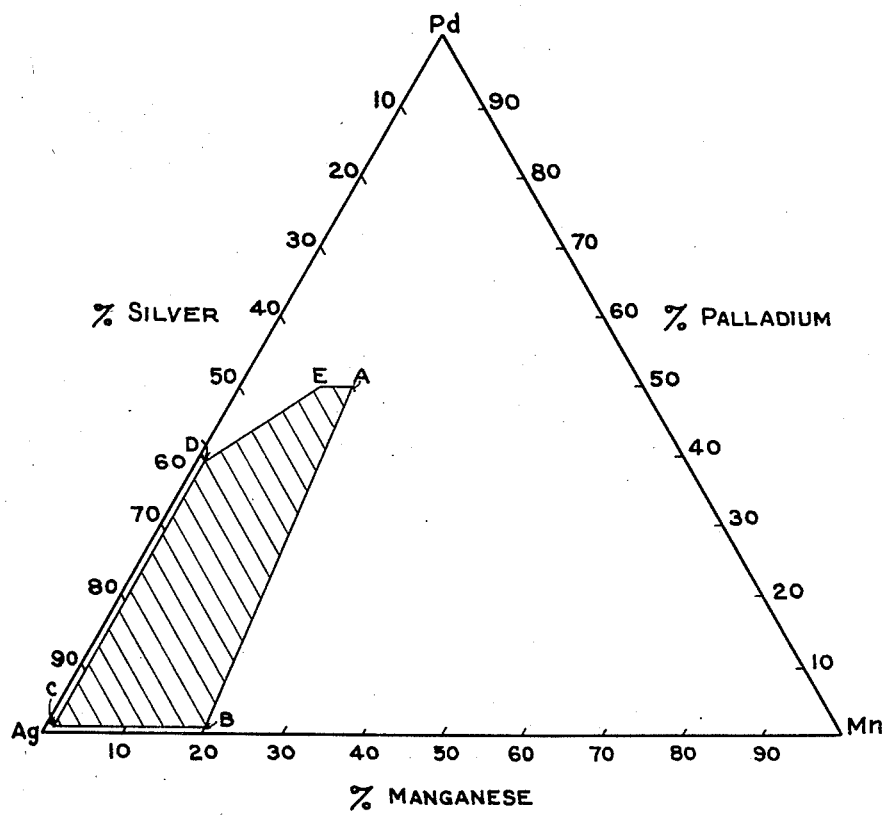
INVENTORS
EDWIN C. RHODES
DAVID W. RHYS
BY
ATTORNEY Patented Oct. 13, 1953

UNITED STATES PATENT OFFICE 2,654,946

2,654,946

SOLDERED JOINT FOR CHROMIUM ALLOY GAS TURBINE STRUCTURES

Edwin Clements Rhodes, London, and David Wade Rhys, Hounslow, England, assignors to The International Nickel Company, Inc., New York, N. Y., a corporation of Delaware Application September 7, 1950, Serial No. 183,522
In Great Britain September 9, 1949

3 Claims. (Cl. 29—194)

The present invention relates to the art of soldering or brazing metal parts which are subjected to high service temperatures, such as of the order of about 550° C. to about 850° C. More particularly, it relates to a novel solder adapted to the foregoing art, especially for the soldering of parts which are made of chromium alloys, such as alloys of chromium with nickel or cobalt or both with or without additions of other elements, particularly iron, and which are designed for high temperature use.

It has heretofore been the practice to employ metal parts made of alloys consisting predominantly of nickel and chromium which were to be used under conditions where considerable resistance to creep was required, such as, for example, in the making of blades for gas turbines. Under the conditions where resistance to creep was not so important, it has been customary to employ alloys wherein iron is the predominant element, such as the alloys commonly known as stainless steels which, as is well known, contain chromium. In all such alloys, the tenacious film of chromium oxide which forms on their surfaces made soldering of the alloys difficult even when carried out in a reducing atmosphere and with the assistance of an active flux. Accordingly, any solder used for the purpose to be satisfactory must have excellent wetting and flowing characteristics. In addition, it must possess the requisite strength, creep resistance and scaling resistance at the high service temperature. Moreover, the solidus temperature of any soldering alloy used must be so high that fusion does not occur during service and the liquidus temperature must be so low as to permit the joining operations to be carried out without detriment to the alloys to be joined. For soldering the nickel-chromium and nickel-chromium-iron alloys commonly used, the melting point of the solder must not be less than 900° C. nor more than 1250° C. It is well known that the alloys of silver and manganese have some of the necessary characteristics for the soldering of these high temperature alloys and in particular the binary alloys containing 85% silver and 15% manganese have been used for this purpose. These alloys have, however, only low mechanical properties at temperatures in the range of 550 to 850° C. and consequently are not suitable for joining parts which are subjected to any considerable stress at such high temperatures. Although attempts have been made by others to overcome the foregoing difficulties and to solve the problem of soldering nickel-chromium and nickel-chromium-iron alloys, none, as far as we are aware, was entirely successful when carried into practice commercially on an industrial scale.

It has now been discovered that the addition of palladium to alloys of silver and manganese not only improves their wetting and flowing characteristics but also produces a very large increase in their mechanical properties at elevated temperatures. It has been found that the special alloys of which silver, palladium, and manganese are essential constituents can be used to great advantage in the uniting or joining of chromium alloys, including nickel-chromium and nickel-chromium-iron alloys, and that the palladium can be added while the percentage of silver or the percentage of manganese or the percentage of both can be decreased and satisfactory results can be obtained.

It is an object of the present invention to provide an improved method for successfully and satisfactorily soldering chromium alloys, including alloys of nickel and chromium, alloys of chromium and cobalt and alloys of nickel, chromium and iron.

The invention also contemplates the provision of an improved solder for soldering chromium alloys, which solder contains as its essential constituents silver, palladium, and manganese.

Another object of the invention is to provide a method of successfully and satisfactorily soldering chromium alloys, such as nickel-chromium or nickel-chromium-iron alloys, in which the solder used is a special ternary alloy comprising silver, palladium, and manganese and having a melting point of not less than about 900° C. nor more than about 1250° C.

The invention likewise has for an object the provision of an improved solder comprising a ternary alloy having a solidus temperature above about 850° C. and a liquidus temperature below about 1250° C. and containing from about 36% to about 98% silver, from about 1% to about 50% palladium, and from about 1% to 20% manganese, together with impurities and minor constituents.

The invention further contemplates an improved method of soldering alloys consisting essentially of nickel and chromium or nickel, chromium and iron, in which the special solder used in the soldering is a ternary alloy having a melting point of not less than about 900° C. nor more than about 1250° C. and containing as its essential elements silver, palladium and manganese, together with impurities and minor innocuous constituents.

Generally speaking, the present invention contemplates an improved process of uniting parts or members of chromium alloys, including nickel-chromium or nickel-chromium-iron alloys, by a special solder wherein silver, palladium and manganese are essential elements and wherein the melting point of the solder is not less than 900° C. nor more than about 1250° C.

The drawing shows the diagram of the ternary alloy of silver, palladium and manganese.

According to the invention, the special alloys used for soldering nickel-chromium or nickel-chromium-iron alloys are those falling within the area bounded by the lines A—B—C—D—E in the ternary alloy diagram shown in the accompanying drawing. It will be seen that all of these alloys lie within the following composition limits or ranges:

| | Per cent |
|---|---|
| Silver | 36–98 |
| Palladium | 1–50 |
| Manganese | 1–20 |

Satisfactory solders have been made from alloys within said limits or ranges which have solidus temperatures above about 900° C. and liquidus temperatures below about 1250° C. As will be understood, the usual concomitant impurities and minor constituents may also be present. In these alloys the palladium together with the silver imparts good resistance to corrosion at high temperatures, and together with the manganese the palladium imparts strength. When the palladium content rises, the mechanical properties at elevated temperatures improve and the melting points increase. As the palladium is the more expensive element, when cost is an important factor and the highest mechanical properties are not required, the lower palladium content alloys within the ranges are particularly suitable. These alloys can be worked without great difficulty. This is advantageous in forming solder alloy strips to be used as fillets between the parts to be united. The soldering of parts with the invention soldering alloys is preferably carried out in a reducing atmosphere. The clearance between the parts to be joined may be from 1.5 to 2 thousandths of an inch or even more without detriment to the quality of the joint.

One example of a solder which can be used with advantage in joining alloys of the 80% nickel-20% chromium type or austenitic steels of the 18–8 chromium-nickel type is a special ternary alloy containing about 75% of silver, about 20% of palladium, and about 5% of manganese. This alloy can be successfully used for brazing or joining operations at a temperature of 1100° C. Joints produced with the new solder have nearly twice the mechanical strength at a temperature of 600° C. as joints formed with conventional solders made from 85% silver and 15% manganese alloys hereinbefore referred to.

As an illustration of the properties obtained, joints made with the 75% silver-20% palladium-5% manganese alloy and tested in shear at high temperatures have given the following results:

| Temperatures, ° C. | Shear Strength, in. |
|---|---|
| 600 | 4.1 |
| 750 | 4.0 |
| 800 | 2.9 |
| 850 | 1.6 |

Cylindrical lap joints have given a life of 500 hours with a stress of one ton per square inch at a temperature of 600° C.

It is to be observed that the present invention provides an improved method for uniting or joining parts or members made of chromium alloys, such as nickel-chromium and nickel-chromium-iron alloys, to produce united structures by the employment of a special solder composed of silver, palladium, and manganese as essential constituents and characterized by having a melting point of not less than about 900° C. nor more than about 1250° C., whereby the united metal parts can be successfully and satisfactorily used under the conditions of high service temperatures of the order of from about 550° C. to about 850° C.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A fabricated gas turbine structure used under conditions of service at high temperatures of the order of about 550° C. to about 850° C. and characterized by high mechanical strength, high-creep resistance and high scaling resistance within said temperature range comprising a plurality of structural parts composed of a chromium alloy of the group consisting of nickel-chromium alloys and nickel-chromium-iron alloys united by a solder joint of an alloy consisting essentially of silver from about 36% to about 98%, palladium from about 1% to about 50%, and manganese from about 1% to about 20% and having a melting temperature of not less than about 900° C. and not more than about 1250° C.

2. A fabricated gas turbine structure used under conditions of service at high temperatures of the order of about 550° C. to about 850° C. and characterized by high mechanical strength, highcreep resistance and high scaling resistance within said temperature range comprising a plurality of structural parts composed of a chromium alloy of the group consisting of nickel-chromium and nickel-chromium-iron alloys united by a solder joint of a silver-palladium-manganese alloy defined by the area A—B—C—D—E in the accompanying drawing.

3. A fabricated gas turbine structure used under conditions of service at high temperatures of the order of about 550° C. to about 850° C. and characterized by high mechanical strength, high-creep resistance and high scaling resistance within said temperature range comprising a plurality of structural parts composed of a chromium alloy of the group consisting of nickel-chromium alloys and nickel-chromium-iron alloys united by a solder joint of an alloy consisting essentially of silver about 75%, palladium about 20%, and manganese about 5% and having a melting temperature of not less than about 900° C. and not more than about 1250° C.

EDWIN CLEMENTS RHODES.
DAVID WADE RHYS.

References Cited in the file of this patent

UNITED STATES PATENTS

| Number | Name | Date |
|---|---|---|
| 2,000,692 | Dimberg | May 7, 1935 |

FOREIGN PATENTS

| Number | Country | Date |
|---|---|---|
| 755,701 | France | Sept. 11, 1933 |
| 610,899 | Germany | Mar. 19, 1935 |
| 628,572 | Germany | Apr. 7, 1936 |
| 541,439 | Great Britain | Nov. 26, 1941 |
| 573,176 | Great Britain | Nov. 9, 1945 |